Oct. 6, 1953 — S. F. PASTURCZAK — 2,654,208
HELICAL CUTTING MECHANISM FOR HARVESTERS
Filed March 31, 1951 — 3 Sheets-Sheet 1

INVENTOR:
STANLEY F. PASTURCZAK
BY
ATT'YS

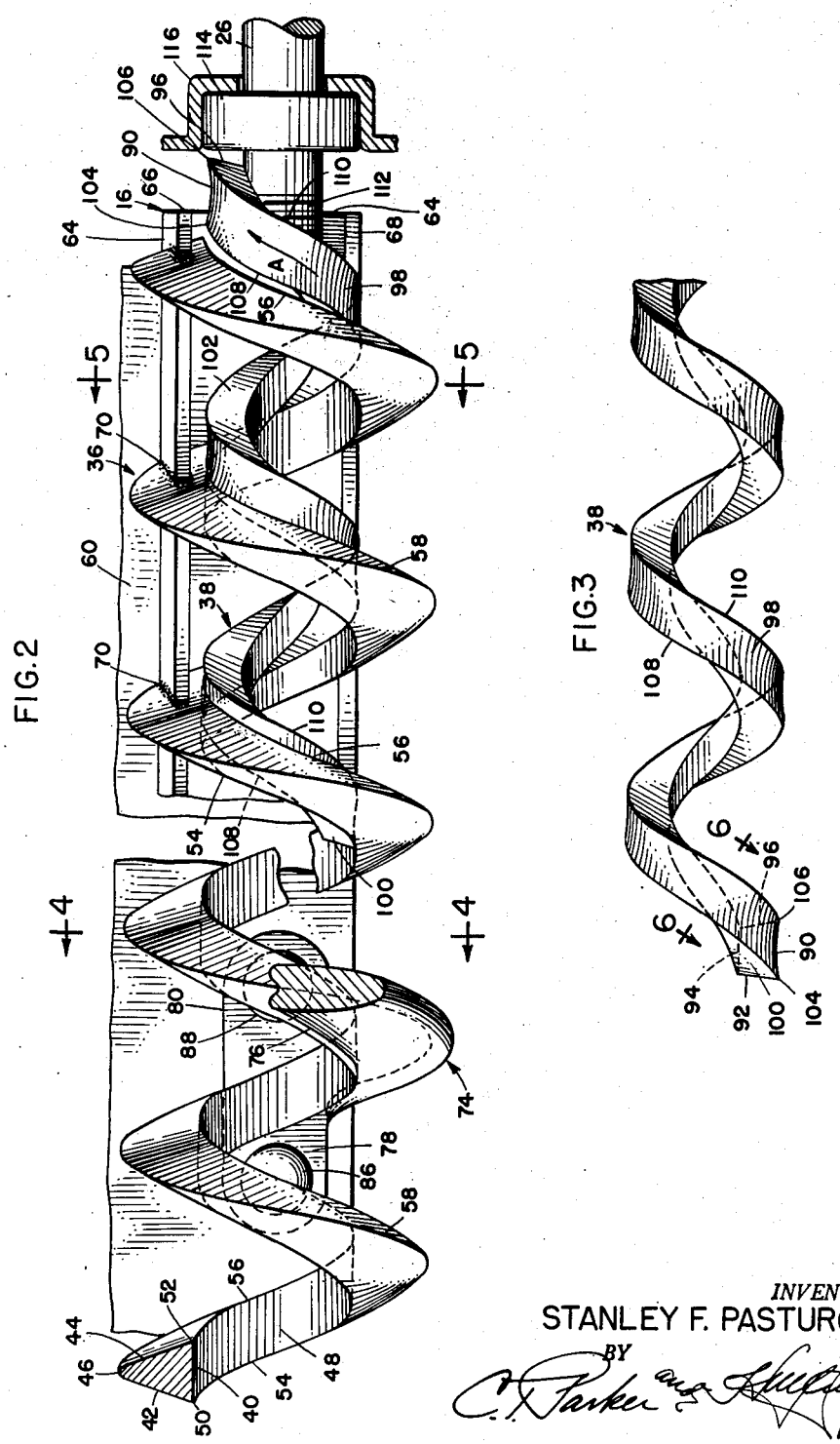

Oct. 6, 1953 S. F. PASTURCZAK 2,654,208
HELICAL CUTTING MECHANISM FOR HARVESTERS
Filed March 31, 1951 3 Sheets-Sheet 3
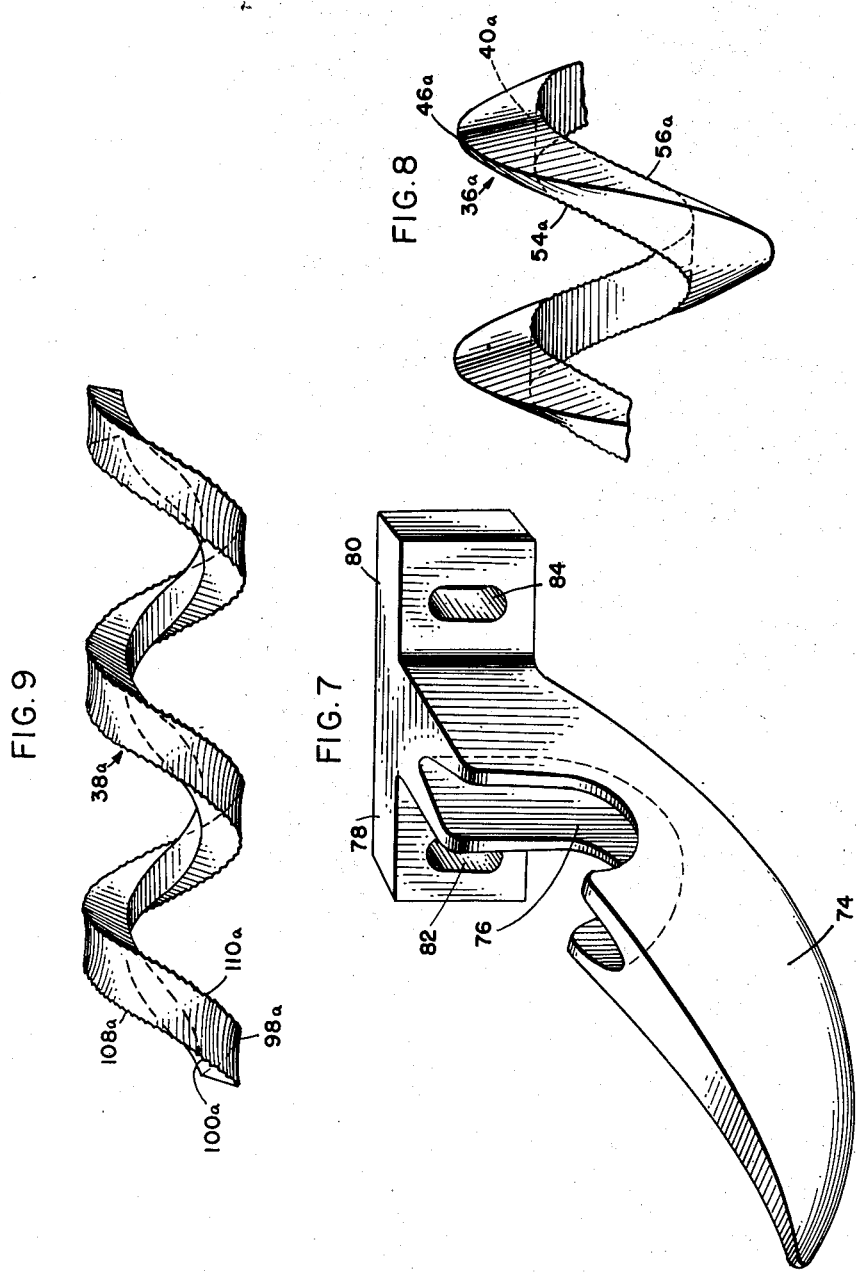
INVENTOR:
STANLEY F. PASTURCZAK
BY
ATT'YS Patented Oct. 6, 1953

2,654,208

UNITED STATES PATENT OFFICE 2,654,208

HELICAL CUTTING MECHANISM FOR HARVESTERS

Stanley F. Pasturczak, East Moline, Ill., assignor to Deere & Company, Moline, Ill., a corporation of Illinois Application March 31, 1951, Serial No. 218,576

2 Claims. (Cl. 56—252)

This invention relates to a crop harvester and more particularly to improved cutting mechanism therefore.

The conventional crop harvester, as typified by a mower or combine, comprises cutting mechanism including a sickle bar disposed transverse to the line of travel and having a plurality of forwardly projecting sickle guards, in addition to which a reciprocating knife is carried by the sickle bar for movement back and forth lengthwise of the bar. This construction has withstood many attempts to replace it, in spite of its inherent disadvantages. Among these disadvantages are relatively high cost, excessive vibration in use, frequent breakage of the parts, replacement or sharpening of the knife, and other malfunctioning inherent in the basic structure.

According to the present invention, it is an object to provide an improved cutting mechanism in which a rotating cutter is substituted for the reciprocating cutter. The rotating cutter is carried in a fixed part of novel design. Specifically, the fixed part or outer part of the cutting mechanism comprises an elongated member of uniform cross section wound as a hollow helix having a uniform inside diameter providing an internal cutting edge. The rotating part comprises a smaller helix of uniform outside diameter arranged in homocentric relation with the outer part and carried thereby for rotation relative thereto so that the inner cutting edge of the outer part and the outer cutting edge of the inner smaller part cooperate to cut crops such as standing grain or grasses. It is a further important object of the invention to provide the outer helix with an internal bearing surface in addition to the internal helical cutting edge. This bearing surface supports the inner helix. In a preferred form of the invention, the inner helix is formed of an elongated member wound in helical form and presenting an outer helical surface delineated by a pair of helical edges, either of which may be used as a cutting edge, since the inner helix can be reversed from end to end. It is a further object to provide the outer helix of such cross sectional stock that a helical outer edge is provided that acts in the form of a divider to function very much in the manner of the conventional mower guard in separating and guiding the standing grain or grasses. Still another object is to provide a cutting mechanism that may be readily used in mowers or combines of existing construction without materially modifying the basic design of such conventional structure.

The foregoing and other important objects and desirable features inherent in and encompassed by the invention will become apparent as a complete disclosure of preferred embodiments of the invention is made in the following detailed description and accompanying sheets of drawings in which Figure 1 is a fragmentary perspective view of a forward portion of a conventional combine equipped with the improved cutting mechanism;

Figure 2 is an enlarged front elevational view of the cutting mechanism, portions of the mechanism being omitted to permit the use of a larger scale in the drawings;

Figure 3 is an enlarged fragmentary elevational view on the same scale as Figure 2 of a portion of the internal cutter;

Figure 7 is a detail perspective view of a supplemental guard or divider used in conjunction with the improved cutting mechanism;

Figure 8 is a fragmentary view of part of a modified form of outer helical member in which the cutting edges are serrated; and Figure 9 is a view similar to Figure 3 but showing a modified form of inner member in which the cutting edges are serrated.

Figure 1:
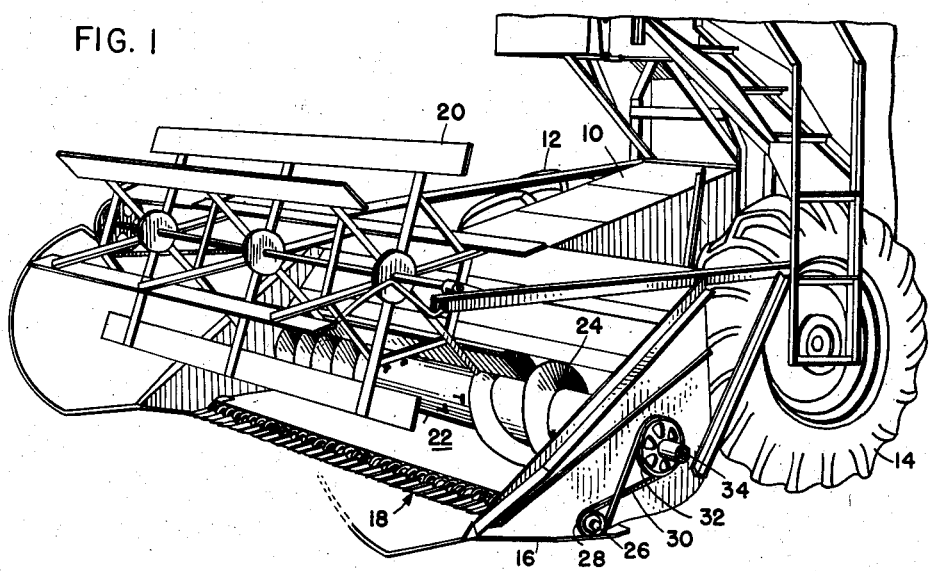

The combine structure illustrated in Figure 1 is merely representative of several types of crop harvesters in which the improved cutting mechanism may be utilized. This structure is therefore typical and does not constitute a limitation upon the applicability of the cutting mechanism in the harvester field.

The combine illustrated is of the self-propelled type having a main body 10 carried on a pair of traction wheels 12 and 14. The main body carries ahead of it a platform structure 16 which is transverse to the line of travel. This platform structure has at a forward or leading portion thereof the improved cutting mechanism, designated generally by the numeral 18. A conventional reel 20 may be used in cooperation with the cutting mechanism 18 to deliver the cut grain or grasses rearwardly into an auger trough 22 in which an auger 24 operates to move the cut grain or grasses transversely and then rearwardly to threshing mechanism (not shown) associated with the combine in the usual manner. A representative complete disclosure will be found in U. S. Patent 2,529,180.

The cutting mechanism has at one end thereof a power input shaft 26 on which is keyed a pulley or sheave 28. This pulley may be driven by a crossed endless belt 30 from a pulley 32 on a shaft 34 which serves to drive the auger 24. These details may, of course, be varied to suit the particular application of the cutting mechanism to different machines.

The cutting mechanism itself, best shown in Figure 2, comprises a first or outer means 36 and a second or inner means 38. The outer means is preferably in the form of an elongated member of uniform triangular section as best shown at the left-hand end of Figure 2. The triangular section thus has three sides 40, 42 and 44, the side 40 forming the base and the sides 42 and 44 extending therefrom and converging to an apex 46. The apex need not be sharp but may be slightly rounded or in the form of an ogive as shown.

The means or first member 36 is wound as a helix, as shown, that has a hollow center of uniform inside diameter. The base or side 40 of the triangular section thus presents to the inside of the helix a helical inner surface 48. The side 42 adjoins or forms a junction at 50 with the base 40 and a similar relationship exists at 52 between the base 40 and the side 44. In its helical form, these two junctions form a pair of continuous helical edges 54 and 56, which are parallel and which delineate opposite edges or margins of the inner helical surface 48. The apex 46 of the triangular section becomes an outer edge 58, giving the helical member 36 a uniform outside diameter from end to end.

Figure 4:
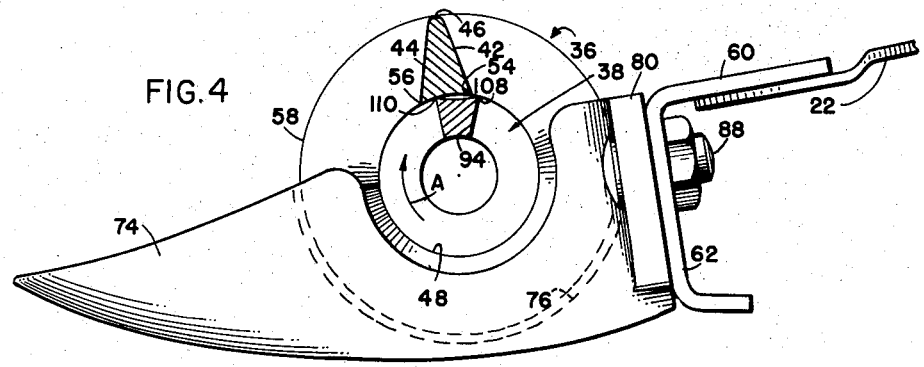
Figure 4 is a transverse sectional view taken on the line 4—4 of Figure 2.
Figure 5:
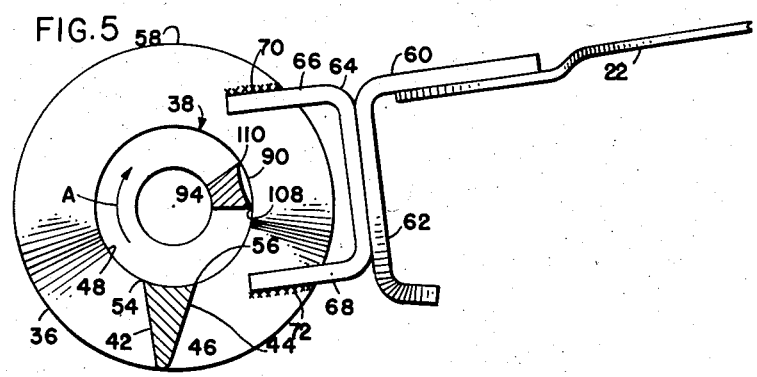
Figure 5 is a transverse sectional view taken on the line 5—5 of Figure 2.

The platform structure 16 comprises framework including a transverse forward member 60 in the form of a rearwardly facing angle (Figures 4 and 5). To the forward flange 62 of the transverse member 60 is secured a second transverse member or support 64 in the form of a forwardly facing channel having upper and lower flanges 66 and 68. These flanges may be notched at intervals to receive axially spaced portions of the helical member 36, which portions are welded to the flanges 66 and 68 respectively at 70 and 72.

From the description thus far, it will be seen that the means or member 36 replaces the conventional sickle bar and guard. Because of the triangular section of the member 36, the outer helical edge 58 serves as divider or guide means for guiding the standing grain or grasses into the spaces between the sections of the helix. To further augment the efficiency of the cutting mechanism, there may be provided a plurality of dividers, only one of which is shown at 74 in Figure 2. This divider is shown also in Figure 4 and is shown by itself in Figure 7. The divider extends forwardly in the form of a finger and has a curved recess 76 formed on part of the basic helix of the member 36 so as to receive a lower portion of the member 36 as suggested in Figures 2 and 4. The divider has a pair of attaching ears 78 and 80 apertured respectively at 82 and 84 to provide for attachment of the divider to the front face of the transverse member 62, as by bolts 86 and 88 (Figure 2).

Figure 6:
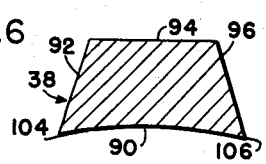
Figure 6 is an enlarged sectional view taken on the line 6—6 of Figure 3.

The second means or inner member 38 is likewise formed from an elongated member wound as a smaller helix having a uniform outside diameter but slightly or tolerably less than the uniform inside diameter of the inner helical surface 48 of the means or member 36. As best shown in Figure 6, the member 38 is preferably of uniform cross section having a plurality of angularly related sides 90, 92, 94 and 96. When the member is wound into helical form, the side 90 is outermost and presents a helical outer surface 98. The sides 92 and 96 present radially inwardly directed helical surfaces 100 and 102. These sides respectively adjoin the side 90 at corners or junctions 104 and 106. These corners present helical outer edges 108 and 110 respectively when the member 38 is wound in helical form.

The helical inner surface 48 of the outer helix 36 is axially directed and the two helical surfaces presented by the sides 42 and 44 of the triangular section of the outer member 36 are radially outwardly directed. The outer surface 98 presented by the side 90 of the inner helix is also axially directed and extends between the helical edges 104 and 106. As best shown in Figures 2 and 6, the surface 98 is concave between these two edges, thus accentuating the edges so that these edges provide cutting edges selectively cooperative with the edge 56 of the outer helix 36, which edge 56 is likewise a cutting edge.

The pitch of the outer helix 36 is preferably uniform, as is the pitch of the inner helix 38; although, it is preferred that the pitches of the two be different. The relationship here shown is such that the pitch of the inner helix is (in inches) 1.75 and the pitch of the outer helix is 2.00. Thus, the pitch of the inner helix is smaller than that of the outer helix. Inasmuch as the inner helix is supported or journaled by the outer helix for rotation relative thereto, the difference in pitch prevents any portion of the inner helix from dropping out of supporting relationship to the outer helix. This is particularly important when it is considered that the cutting mechanism has considerable length, which may be from anywhere from 6 to 16 feet, for example.

As stated above, the cutting mechanism is driven by the shaft 26. Specifically, this may be accomplished by providing external threads at 112 on the shaft 26 which mate with internal threads (not shown but suggested) at one end of the inner helix 38. The shaft 26 may be carried in a suitable thrust bearing 114 carried in a side wall portion 116 of the platform structure 16.

In operation, the combine proceeds forwardly over the field and the standing grain or grasses is directed into the cutting mechanism because of the apex edge 58 on the outer helix 36. The crop is caused to enter the spaces between the helical portions of the helices 36 and 38, where it is cut by the cooperating cutting edges 108 and 56. This will be apparent from an examination of Figure 2. The inner helix 38 rotates in the direction of the arrow A shown in Figures 2, 4 and 5.

Since the helix 38 is uniform, as is the helix 36, the former may be changed from end to end and utilized in such manner that the edge 110 becomes a cutting edge cooperative with the cutting edge 56 on the outer helix 36. This is a distinct advantage, because the inner helix presents alternate cutting edges and, because it may be inexpensively manufactured, both edges may be used and the member discarded and replaced with a new one of similar design.

In the modified forms of the invention shown in Figures 8 and 9, the fundamental design of the two helices is followed. Therefore, the same reference characters, followed by the exponent "a," will be used. The only difference between the two is that the two edges 54a and 56a may be serrated or otherwise roughened as shown, which design may be desirable in certain crop conditions.

The inner helix 38a is modified in the same manner, the cutting edges 108a and 110a being serrated as illustrated.

Various subsidiary features of the invention not specifically enumerated herein will undoubtedly occur to those versed in the art, as likewise will various modifications and alterations in the preferred designs illustrated, all of which may be achieved without departing from the spirit and scope of the invention as defined in the appended claims.

What is claimed is:

1. Cutting mechanism, comprising: a fixed support; a first elongated member of uniform cross-section wound as a hollow helix of uniform pitch presenting a helical, internal bearing surface of uniform diameter, said surface having one marginal edge thereof formed as a coextensive helical cutting edge; means rigidly securing said first member at axially spaced portions thereof to the support; a second elongated member wound as a smaller helix of uniform pitch and having an external helical bearing surface of uniform diameter but tolerably smaller than the diameter of the aforesaid internal bearing surface; said members being homocentrically arranged with the second member inside and rotatable relative to the first member, said bearing portion on the second member riding on the internal bearing surface of the first member; said bearing portion on the second member having one marginal edge thereof formed as a coextensive helical cutting edge cooperative with the first member cutting edge; the ratio of the pitch of the first helix to the diameter of the internal bearing surface being in the order of between 1:1 and 2:1, and the pitch of the second helix exceeding that of said first helix.

2. The invention defined in claim 1, in which: the cross-section of the first member is substantially triangular with the base of said triangular section toward the internal bearing surface and the sides of said triangular section converging radially outwardly to an apex, giving said first member an outer helical edge serving as a crop divider.

STANLEY F. PASTURCZAK.

References Cited in the file of this patent

UNITED STATES PATENTS

| Number | Name | Date |
|---|---|---|
| 17,739 | Irwin | July 7, 1857 |
| 23,552 | Colborn | Apr. 12, 1859 |
| 227,950 | Beekman | May 25, 1880 |
| 957,468 | Lynch | May 10, 1910 |
| 1,231,174 | Koons | June 26, 1917 |
| 2,309,635 | Edwards | Feb. 2, 1943 |